(12) United States Patent
Bertero et al.

(10) Patent No.: US 7,070,870 B2
(45) Date of Patent: *Jul. 4, 2006

(54) MAGNETIC MEDIA WITH IMPROVED EXCHANGE COUPLING

(75) Inventors: Gerardo Bertero, Redwood City, CA (US); Sudhir Malhotra, Fremont, CA (US); David Wachenschwanz, Saratoga, CA (US); Zhengsheng Shan, Fremont, CA (US); Donald Stafford, Fremont, CA (US)

(73) Assignee: Komag, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/048,153

(22) Filed: Feb. 1, 2005

(65) Prior Publication Data

US 2005/0129984 A1    Jun. 16, 2005

Related U.S. Application Data

(63) Continuation of application No. 10/075,123, filed on Feb. 12, 2002, now Pat. No. 6,899,959.

(51) Int. Cl.
  *G11B 5/66* (2006.01)
(52) U.S. Cl. .................... 428/828; 428/828.1; 360/131
(58) Field of Classification Search ..................... None
  See application file for complete search history.

(56) References Cited

U.S. PATENT DOCUMENTS

| 5,051,288 A | 9/1991 | Ahlert et al. .................. 428/64 |
| 5,147,732 A | 9/1992 | Shiroishi et al. ............ 428/668 |
| 5,412,809 A | 5/1995 | Tam et al. .................... 713/324 |
| 5,580,667 A | 12/1996 | Lal et al. ..................... 428/610 |
| 5,607,740 A | 3/1997 | Noda ......................... 428/65.3 |
| 5,688,380 A | 11/1997 | Koike et al. .............. 204/192.2 |
| 5,693,426 A | 12/1997 | Lee et al. .................... 428/611 |
| 5,756,202 A | 5/1998 | Van Kesteren et al. ..... 428/332 |
| 5,834,111 A | 11/1998 | Lal et al. ..................... 428/332 |
| 5,843,569 A | 12/1998 | Kaitsu et al. ............... 428/323 |
| 5,846,648 A | 12/1998 | Chen et al. .................. 428/332 |
| 5,851,643 A | 12/1998 | Honda et al. ............... 428/212 |
| 5,851,656 A | 12/1998 | Okhubo ...................... 428/332 |
| 5,898,549 A | 4/1999 | Gill ............................ 360/113 |
| 6,077,586 A | 6/2000 | Bian et al. ................. 428/65.3 |

(Continued)

FOREIGN PATENT DOCUMENTS

EP    0 704 839 A1    4/1996

(Continued)

OTHER PUBLICATIONS

Parkin et al., "Oscillations in Exchange Coupling and Magnetoresistance in Metallic Superlattice Structures: Co/Ru, Co/Cr, and Fe/Cr", Physical Review Letters, vol. 64, No. 19, May 7, 1990, pp. 2304-2307.

(Continued)

*Primary Examiner*—Kevin M. Bernatz (57) ABSTRACT

A magnetic recording medium includes a substrate, an underlayer, a lower magnetic layer formed on the underlayer, an intermediate layer, and an upper magnetic layer formed on the intermediate layer. The intermediate layer is typically Ru, and promotes anti ferromagnetic coupling between the upper and lower magnetic layers. The upper and lower magnetic layers are typically Co alloys. The lower magnetic layer has a high saturation magnetization Ms to promote high exchange coupling between the upper and lower magnetic layers. The dynamic coercivity of the lower magnetic layer is lower than the exchange field to ensure rapid switching of the lower magnetic layer.

10 Claims, 7 Drawing Sheets

U.S. PATENT DOCUMENTS

| | | |
|---|---|---|
| 6,261,681 B1 | 7/2001 | Suekane et al. ............ 428/332 |
| 6,280,813 B1 | 8/2001 | Carey et al. ............... 428/65.3 |
| 6,456,466 B1 | 9/2002 | Nakamoto et al. .......... 360/319 |
| 6,537,684 B1 | 3/2003 | Doerner et al. ............. 428/611 |
| 2001/0051287 A1 | 12/2001 | Kikitsu et al. ....... 428/694 ML |
| 2002/0039668 A1 | 4/2002 | Inomata ............... 428/694 TM |
| 2002/0045069 A1 | 4/2002 | Shinohara et al. ..... 428/694 TS |
| 2002/0132140 A1 | 9/2002 | Igarashi et al. ...... 428/694 TM |
| 2003/0022023 A1 | 1/2003 | Carey et al. ........ 428/694 MM |
| 2003/0035973 A1 | 2/2003 | Trindade ................... 428/494 |
| 2003/0104247 A1 | 6/2003 | Girt .......................... 428/693 |
| 2003/0108776 A1 | 6/2003 | Chang et al. ........ 428/694 TM |

FOREIGN PATENT DOCUMENTS

| | | |
|---|---|---|
| EP | 0892393 A1 | 1/1999 |
| EP | 1059629 A2 | 12/2000 |
| EP | 1059629 A3 | 3/2002 |
| GB | 2355018 A | 4/2001 |
| JP | 63-146219 | 6/1998 |
| WO | WO 96/24927 | 8/1996 |
| WO | WO 97/34295 | 9/1997 |

OTHER PUBLICATIONS

E.S. Murdock et al., "Noise-Properties of Multilayered Co-alloy Magnetic Recording Media", IEEE Transactions on Magnetics, vol. 26, No. 5, Sep. 1990, pp. 2700-2705.

Li-Lien Lee et al., "NiAl Underalayers for CoCrTa Magnetic Thin Films", IEEE Transactions on Magnetics, vol. 38, No. 6, Nov. 1994, pp. 3951-3953.

Fullerton et al., "Antiferromagnetically Coupled Magnetic Media Layers for Thermally Stable High-Density Recording", Applied Physics Letters, vol. 77, No. 23, Dec. 4, 2000.

Abarra et al., "Longitudinal Magnetic Recording Media with Thermal Stabilization Layers", Applied Physics Letters, vol. 77, No. 16, Oct. 16, 2000.

Inomata et al., "Exchange Coupling Strength in Synthetic Ferrimagnetic Media", IEEE Transactions on Magnetics, vol. 37, No. 4, Jul. 2001, pp. 1449-1451.

H. Richter, W. Wu and R. Malmhall, IEEE Trans. Mag., 34(4), 1998, 1540-1542.

H. Richter and E. Girt IEEE Trans. Mag., 37(4), 2001, 1441-1444.

Paper Titled "Preparation of Papers for 200$^{th}$ IEEE SOFE".

Abarra et al., "Synthetic Ferrimagnetic Media", IEEE Transactions on Magnetics, vol. 37, No. 4, Jul. 2001, pp. 1426-1431.

Ramamurthy et al., Advanced Media for Extremely High-Density Longitudinal Magnetic Recording, Proc. of 6$^{th}$ International. Symposium on Magnetic Materials, Processes and Devices, Phoenix, Oct. 2000.

Acharya et al., "Synthetic Ferrimagnetic Media for Over 100 Gb/in$^2$ Longitudinal Magnetic Recording", Joint European Magnetism Symposia, Grenoble, France, Sep. 1, 2001.

MAGNETIC MEDIA WITH IMPROVED EXCHANGE COUPLING

This application is a continuation of U.S. patent application Ser. No. 10/075,123, filed 2/12/02 now U.S. Pat. No. 6,899,959.

BACKGROUND OF THE INVENTION

This invention pertains to magnetic recording media such as magnetic disks.

Figure 1:
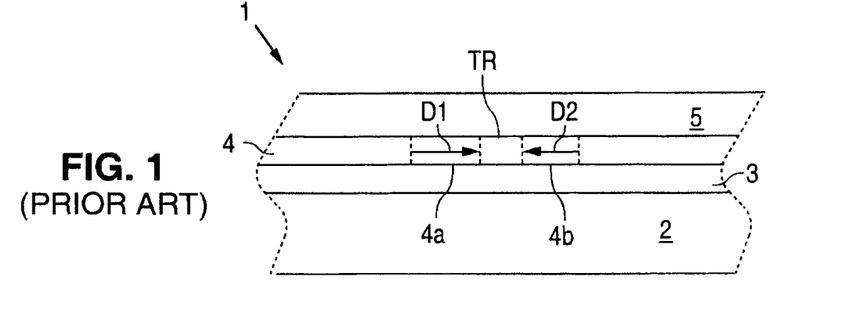
FIG. 1 illustrates in cross section a first magnetic recording medium constructed in accordance with the prior art.

FIG. 1 illustrates a magnetic recording medium 1 constructed in accordance with the prior art used for longitudinal data recording. Medium 1 comprises a substrate 2, an underlayer 3, a Co alloy magnetic layer 4 and a carbon protective overcoat 5. Also shown in FIG. 1 is a first region 4a of layer 4 magnetized in a first direction D1, a second region 4b magnetized in a second direction D2 opposite the first direction, and a transition region TR between regions D1 and D2. In magnetic recording, it is desirable for transition region TR to be as small as possible in order to maximize areal recording density. In general, the length of transition region TR is proportional to MrT/Hc, where Mr is the magnetic remanence of the Co alloy, r is the thickness of layer 4, and Hc is the coercivity of layer 4.

In order to reduce the length of region TR, one might be tempted to reduce MrT. Unfortunately, reducing MrT in medium 1 reduces the thermal stability of layer 4. In other words, reducing MrT reduces the ability of layer 4 to retain its magnetization state, and hence the data recorded in layer 4, as temperature increases. (Obviously, thermal stability is a highly desirable characteristic in a magnetic medium.)

Figure 2:
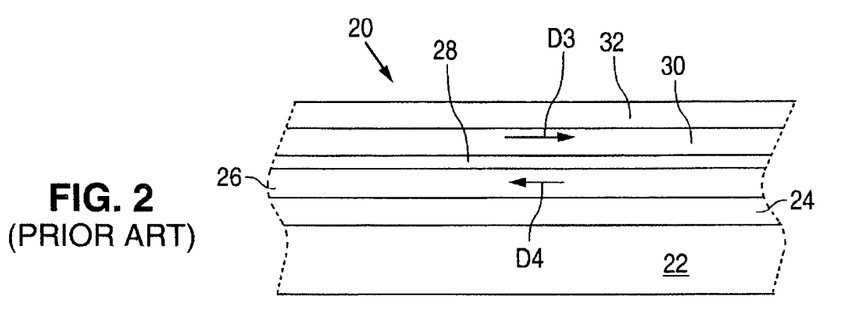
FIG. 2 illustrates in cross section a second magnetic recording medium constructed in accordance with the prior art comprising a Ru layer for facilitating antiferromagnetic coupling between upper and lower magnetic Co alloy layers.

FIG. 2 illustrates a second magnetic recording medium 20 in accordance with the prior art comprising a substrate 22, an underlayer 24, a lower Co alloy magnetic layer 26, a Ru layer 28, an upper Co alloy magnetic layer 30 and a carbon protective overcoat 32. Medium 20 is designed to facilitate simultaneous reduction of the length of transition region TR and increase in thermal stability. In particular, if Ru layer 28 has a thickness within a certain range (e.g. 0.3 to 1.0 nm), magnetic layers 26 and 30 are antiferromagnetically coupled to one another. Because of this, the length of transition region TR for medium 20 is proportional to $Mr_{26}T_{26} - KMr_{30}T_{30}$, where K is a proportionality constant, $Mr_{26}$ is the magnetic remanence of layer 26, $T_{26}$ is the thickness of layer 26, $Mr_{30}$ is the magnetic remanence of layer 30 and $T_{30}$ is the thickness of layer 30. (Constant K is related to the degree of antiferromagnetic coupling between layers 26 and 30.) However, the thermal stability of medium 20 increases as a function of $Mr_{26}T_{26} + K_2 Mr_{30}T_{30}$. Thus, while the antiferromagnetic coupling permits one to reduce the length of transition region TR, it also improves thermal stability. (The antiferromagnetic coupling also improves the signal to noise ratio of medium 20.)

Figure 3:
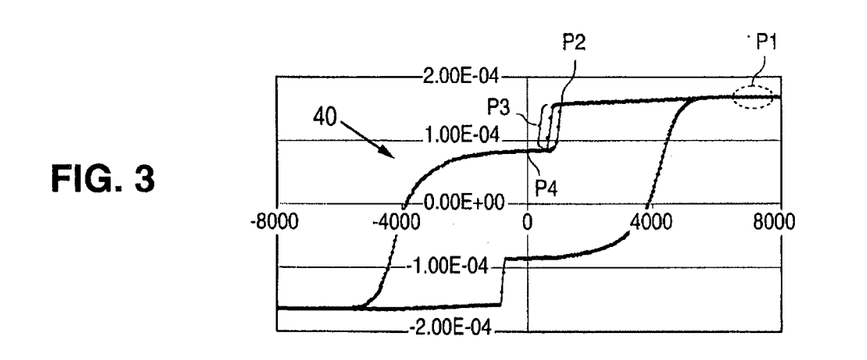
FIG. 3 is a hysteresis loop for a magnetic recording medium if upper and lower magnetic layers were strongly antiferromagnetically coupled to one another.

When recording data in medium 20 of FIG. 2, because of the antiferromagnetic coupling between layers 26 and 30, when one magnetizes a region within layer 30, e.g. as shown by arrow D3, the magnetization direction of layer 26 is in the opposite direction, e.g. as shown by arrow D4. FIG. 3 shows a hysteresis loop 40 for the structure of FIG. 2 if layers 26 and 30 were strongly coupled. As can be seen, as one increases the applied magnetic field $H_{app}$ to medium 20, in portion P1 of hysteresis loop 40, both magnetic layers 26 and 30 are magnetized in the same direction D3. As one reduces the applied magnetic field $H_{app}$ past point P2, the magnetization direction of layer 26 begins to switch to direction D4. Portion P3 of hysteresis loop 40 shows the magnetic characteristics of medium 20 as layer 26 changes magnetization direction in response to applied magnetic field $H_{app}$. As applied magnetic field $H_{app}$ is brought to zero (point P4), layer 26 is magnetized in direction D4.

Figure 4:
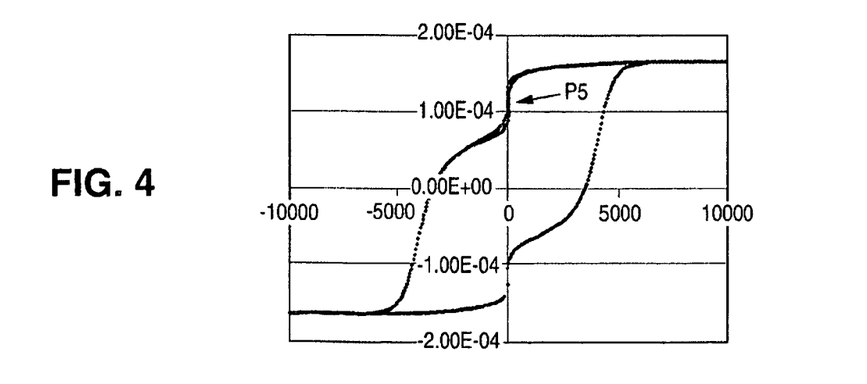
FIG. 4 is a hysteresis loop for a magnetic recording medium if upper and lower magnetic layers were weakly antiferromagnetically coupled to one another.

FIG. 4 shows a hysteresis loop of medium 20 if layer 26 were weakly antiferromagnetically coupled to layer 30. As can be seen, the point P5 at which layer 26 switches magnetization direction (i.e. from direction D3 to D4) occurs at a much lower applied magnetic field $H_{app}$ in FIG. 4 than in FIG. 3. Weak coupling between layers 26 and 30 is disadvantageous because it increases the amount of time required to switch the state of medium 20 to an antiferromagnetic state. In particular, it takes more time to create a situation in which layer 30 is magnetized in direction D3 and layer 26 is magnetized in direction D4. The magnetic recording medium relies on thermal energy to switch the magnetization direction of layer 26 to direction D4. Further, weak coupling can also create a situation in which layer 26 is not as completely magnetized as desired when $H_{app}$ is brought to zero.

Figure 5:
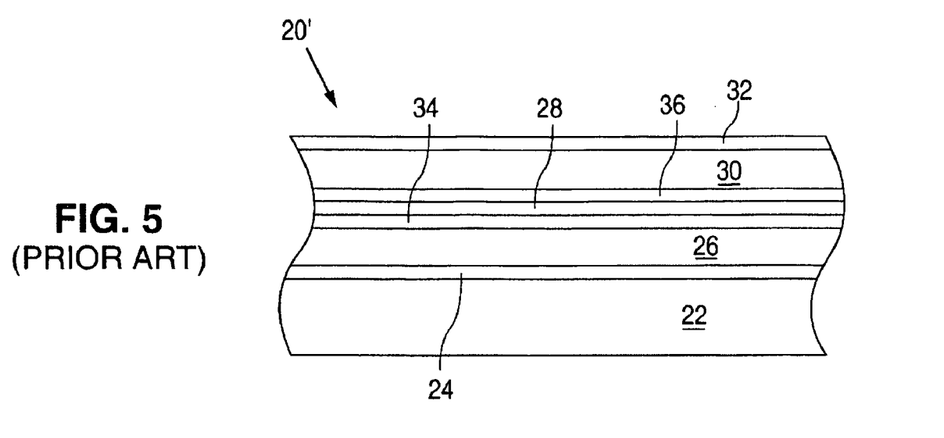
FIG. 5 illustrates in cross section a third magnetic recording medium constructed in accordance with the prior art comprising a Co layer formed between magnetic Co alloy layers and a Ru layer.

It would be desirable to increase antiferromagnetic coupling between layers 26 and 30. One way to do this is to add pure Co layers 34 and 36 on each side of Ru layer 28, e.g. as provided in medium 20' shown in FIG. 5. Co layers 34 and 36 increase antiferromagnetic coupling between layers 26 and 30. Unfortunately, Co layers 34 and 36 increase noise in medium 20' because of intergranular magnetic coupling in layers 34 and 36. It would be highly desirable to increase antiferromagnetic coupling between layers 26 and 30 without suffering this increase in noise.

SUMMARY

A magnetic recording medium in accordance with the invention comprises a lower magnetic layer, an intermediate layer above the lower magnetic layer, and an upper magnetic layer above the intermediate layer. The recording medium is typically a magnetic disk. The upper and lower magnetic layers are ferromagnetic, and typically comprise a Co alloy, a Fe alloy or a Ni alloy. The intermediate layer has the characteristic that it induces antiferromagnetic coupling between the upper and lower magnetic layers. In one embodiment, the intermediate layer comprises Ru.

In accordance with one aspect of the invention, the lower magnetic layer has a high Ms in order to facilitate a high exchange field Hex. (The exchange field is a measure of the amount of coupling between the upper and lower magnetic layers.) In one embodiment, the Ms of the lower magnetic layer is greater than or equal to 250 emu/cm$^3$, and typically greater than 300 emu/cm$^3$. The Ms of the lower magnetic layer can be less than or equal to 2000 emu/cm$^3$ and generally less than or equal to 1400 emu/cm$^3$.

It has been discovered that the high Ms values cooperate with the Ru intermediate layer to provide strong antiferromagnetic coupling. (It is believed that the reason that a high Ms promotes antiferromagnetic coupling is that coupling is a function of the density of spins available for transport across the Ru. The higher the Ms, the greater the spin density, the higher the amount of exchange across the Ru.)

In accordance with another aspect of the invention, the relation between dynamic coercivity Hc and the exchange field Hex is such that the lower magnetic layer will reach its steady state magnetization condition after writing within one period of revolution of the magnetic disk in one embodiment, the lower magnetic layer will reach between 90 and 100% of its steady state magnetization condition within one period of revolution of the magnetic disk. In another embodiment, the lower magnetic layer will reach between 95 and 100% of its steady state magnetization condition within one period of revolution of the magnetic disk.

Hc of the lower magnetic layer is greater than or equal to zero but less than the exchange field Hex at recording switching times. The Hc of the lower magnetic layer at recording switching times is typically less than or equal to about one half of the exchange field for recording times. This facilitates quickly switching the lower magnetic layer to its desired magnetization direction. (The Hc of the upper magnetic layer at recording switching times is typically substantially greater than the Hc of the lower magnetic layer at recording switching times.)

In accordance with another feature of the invention, the anisotropy constant Ku of the upper magnetic layer is greater than $0.5 \times 10^6$ ergs/cm$^3$ to provide good thermal stability. In one embodiment, the Ku of the upper layer is greater than $1.0 \times 10^6$ ergs/cm$^3$. (The Ku of the upper magnetic layer should not be so high as to hamper writing, and is typically less than $10^7$ ergs/cm$^3$.) The Ku of the lower layer can be smaller than the Ku of the upper layer. For example, the lower magnetic layer can have a Ku of $1.0 \times 10^4$ ergs/cm$^3$, $1.0 \times 10^3$ ergs/cm$^3$, or even lower (but greater than or equal to 0 ergs/cm$^3$). (A lower Ku for the lower magnetic layer facilitates a lower coercivity, which in turn facilitates ease of switching the magnetization direction of the lower magnetic layer.)

In one embodiment, the lower magnetic layer is a Co based alloy comprising between 5 and 20 at. % Cr, 0 to 6 at. % Ta, 0 to 10 at. % B and 0 to 10 at. % Pt. The alloy can contain between 0 and 10 at. % X, where X is one or more other elements. In one embodiment, X is one or more of Nb, Ta, Cu, Mo, W, V, Si, C, Pd, Ru, Ir or Y. Preferably, this alloy exhibits a Ms, Hc and Ku as described above.

In one embodiment, the upper magnetic layer is a Co based alloy comprising between 10 and 30 at. % Cr, 8 to 20 at. % Pt and 0 to 20 at. % B. The upper magnetic layer can comprise between 0 and 10 at. % X, where X is one or more other elements. X can be one or more of Nb, Ta, Cu, Mo, W, V, Si, C, Pd, Ru, Ir or Y. Again, preferably the alloy exhibits a Hc and Ku as described above.

A magnetic recording medium in accordance with another embodiment of the invention comprises two or more Ru interlayers (e.g. two, three or more interlayers), each sandwiched between two magnetic layers. The uppermost magnetic layer has the same characteristics as described above for the upper magnetic layer. The magnetic layers below the Ru interlayers have the same characteristics as described above for the lower magnetic layer.

Although the foregoing description refers to upper and lower magnetic layers, either or both of the upper and lower magnetic layers can comprise a plurality of sublayers of different compositions. Thus, for example, if the lower layer comprises a plurality of sublayers, the effective composite Ms of the sublayers combined should be a value as described above. Similarly, if the upper or lower layer comprises a plurality of sublayers, the effective composite dynamic Hc (e.g. at recording times) and Ku of the sublayers should be a value as described above.

DETAILED DESCRIPTION

Figure 6:
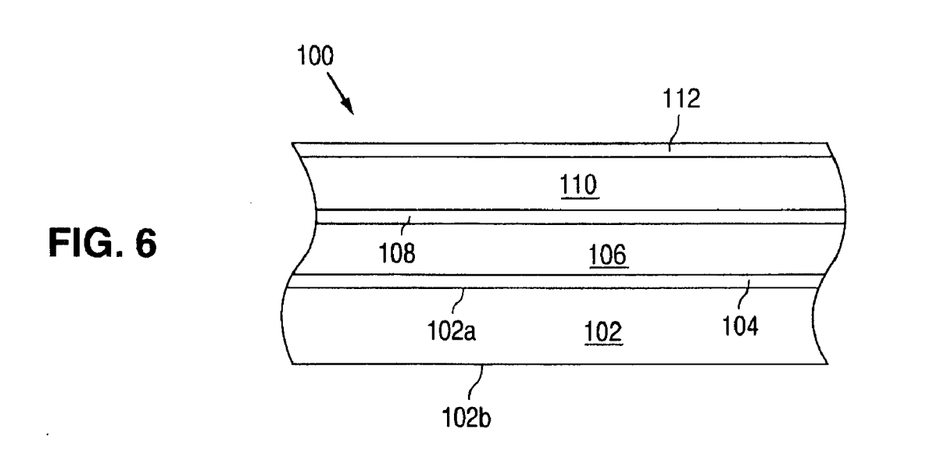
FIG. 6 illustrates in cross section a magnetic recording medium constructed in accordance with a first embodiment of the invention.

Referring to FIG. 6, a magnetic recording medium 100 in accordance with the invention comprises a non-magnetic substrate 102, an underlayer 104, a lower magnetic layer 106, an intermediate layer 108, an upper magnetic layer 110 and a carbon protective overcoat 112. Substrate 102 can be an aluminum alloy substrate coated with an electroless plated nickel-phosphorus alloy. Alternatively, substrate 102 can be glass, glass-ceramic, or other appropriate material. (Typically, the above-mentioned layers are formed on both the top and bottom surfaces 102a, 102b of substrate 102, but only the layers on top surface 102a are shown for ease of illustration.)

Magnetic layers 106 and 110 are typically Co, Fe or Ni-based alloys. Layer 106 is typically between 2 and 8 nm thick, and layer 110 is typically 6 to 30 nm thick. Intermediate layer 108 is typically Ru or a Ru alloy (e.g. consisting essentially of Ru). (Layer 108 is typically between 0.3 and 1.0 nm thick.) For the case of Co alloys, layers 106 and 110 typically have a HCP crystal structure and a 1120 orientation.

Underlayer 104 is typically Cr or a Cr alloy such as Cr—Mo. In one embodiment, underlayer 104 comprises $Cr_{80}Mo_{20}$ (at. %), has a thickness of 10 nm, and a BCC crystal structure.

As mentioned above, in accordance with one aspect of the invention, magnetic recording medium 100 exhibits a high exchange field Hex. This is typically accomplished (at least in part) by ensuring that magnetic layer 106 exhibits a high Ms, preferably greater than or equal to 250 emu/cm$^3$, and typically greater than or equal to 300 emu/cm$^3$, and in one embodiment, greater than 350 emu/cm$^3$. Typically, the Ms of layer 106 is less than 2000 emu/cm$^3$ and for the case in which layer 106 comprises primarily Co, the Ms of layer 106 is less than about 1400 emu/cm$^3$. (While the lower magnetic layer 106 can have a higher Ms than upper magnetic layer 110, upper magnetic layer 110 typically has a higher magnetic moment MsT (magnetization times thickness) than lower magnetic layer 106.)

Also as mentioned above, the coercivity Hc of layer 106 is typically greater than or equal to zero but less than the exchange field Hex at recording switching times. The recording switching time is the amount of time one exposes a point on the recording medium to a write magnetic field. For the case of a magnetic disk in a disk drive during recording, the recording switching time is approximately the amount of time it takes a point on the spinning disk to travel the length of the head write gap. (Disks in currently manufactured disk drives spin at a rate between about 4,000 and 15,000 rpm. This corresponds to a period of rotation of 15 milliseconds to 4 milliseconds.) For disk drives currently being produced, the switching time is about 10 ns. Coercivity is the strength of the magnetic field applied to a magnetized region of a magnetic film that is required to reduce the magnetization of that region to zero. (It is a measure of the field strength needed to record data in the film.) Coercivity depends on the length of time one applies the magnetic field to a region of the magnetic film. In other words, it requires a stronger magnetic field to write to a magnetic film if the field is only applied to the film for a very short time than if the field is applied to the film for a very long time. In one embodiment, the coercivity of lower magnetic layer 106 at recording switching times is less than the exchange field Hex of medium 100, and preferably less than or equal to one half of exchange field Hex (e.g. for a recording switching time of 100 ns or less). Typically, the above-mentioned condition holds true for switching times of 1 ns to 10 ns or less (or generally between 100 picoseconds and 100 ns). This facilitates the switching of the magnetization layer 106 to a direction opposite that of layer 110. (Optionally, the above-mentioned coercivity condition may also hold true for other amounts of time that a write field is applied to a region of medium 100.)

In one embodiment, upper layer 110 has a static coercivity greater than 3000 Oe (but typically less than 10,000 Oe). Lower layer 106 has a static coercivity less than 2500 Oe (but typically greater than or equal to 0 Oe).

Upper layer 110 has a dynamic coercivity (e.g. for switching times of 10 ns or less) between 6000 and 25,000 Oe. Lower layer 106 has a dynamic coercivity less than 2500 Oe (but typically greater than or equal to 0 Oe).

Magnetic layer 106 is typically a HCP Co alloy. In one embodiment, layer 106 has 5 to 20 at. % Cr, 0 to 6 at. % Ta, 0 to 10 at. % B, 0 to 10 at. % Pt, and the balance is Co. For example, layer 108 can be CoCr$_{16}$Ta$_4$. (As used herein, CoCr$_{16}$Ta$_4$ means an alloy comprising 16 at. % Cr, 4 at. % Ta, and the remainder Co.) Alternatively, layer 106 can have 0 to 10 at. % X, where X is one or more other elements, e.g. one or more of Cu. Mo, W, V, Si, C, Pd, Ru, Ir or Y. Layer 106 can have a Ku greater than or equal to 1.0×10$^4$ ergs/cm$^3$, e.g. between 0.5×10$^6$ and 1.0×10$^6$ ergs/cm$^3$.

In an alternative embodiment, lower magnetic layer 106 can be another magnetically soft material with intergranular decoupling, e.g. suitably modified NiFe (permalloy), FeAlSi (sendust), CoTaZr, FeTaC, NiFeNb, CoFe, NiCrFe, NiV, CuNi, FeRh or PtMn.

Magnetic layer 110 is also typically a Co alloy layer and has a high Ms. In one embodiment, layer 110 has between 10 and 30 at. % Cr, 8 to 20 at. % Pt, 0 to 20 at. % B and the balance Co. For example, layer 110 can be CoCr$_{15}$Pt$_{11}$B$_{11}$. Alternatively, layer 110 can also include 0 to 10 at. % X, where X is one or more other elements, e.g. one or more of Nb, Ta, Cu, Mo, W, V, Si, C, Pd, Ru, Ir or Y. In one embodiment, layer 110 has a high Ku, e.g. a Ku greater than about 1.0×10$^6$ erg/cm$^3$, e.g. between 1.0×10$^6$ and 1.0×10$^7$ erg/cm$^3$ to promote thermal stability. (The Ku of layer 110 is greater than that of layer 106.) Layer 110 also has a high Ms, e.g. greater than 300 emu/cm$^3$. In one embodiment, layer 110 has a Ms between 300 and 650 emu/cm$^3$.

Figure 8A:
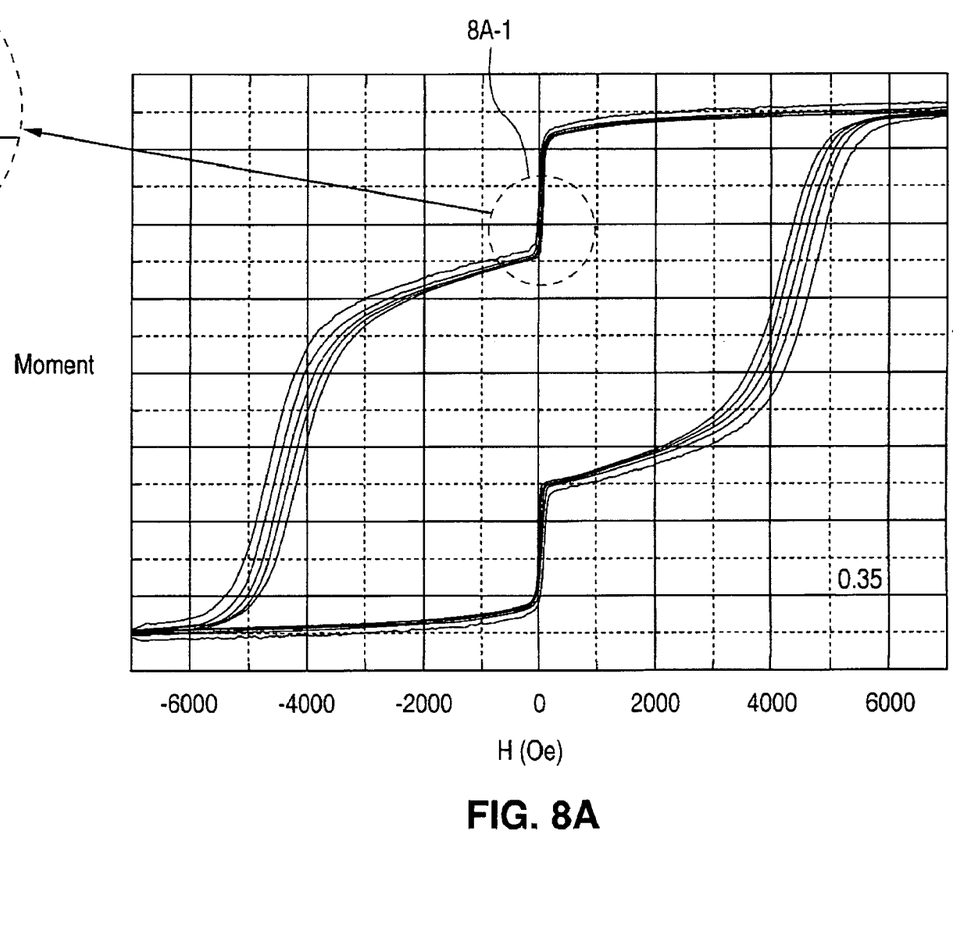
FIG. 8A illustrates the effect of H-Field Sweep Rate on MrT in a magnetic recording medium in which the lower magnetic film has an Ms of 300 emu/cm$^3$.
Figure 8A:
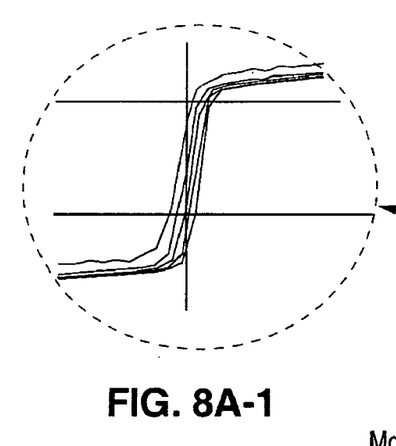
FIG. 8B illustrates the effect of H-Field Sweep Rate on Mr T for a magnetic recording medium in which the lower magnetic film has an Ms of 550 emu/cm$^3$ and therefore a higher exchange field than that of FIG. 8A.
Figure 8B:
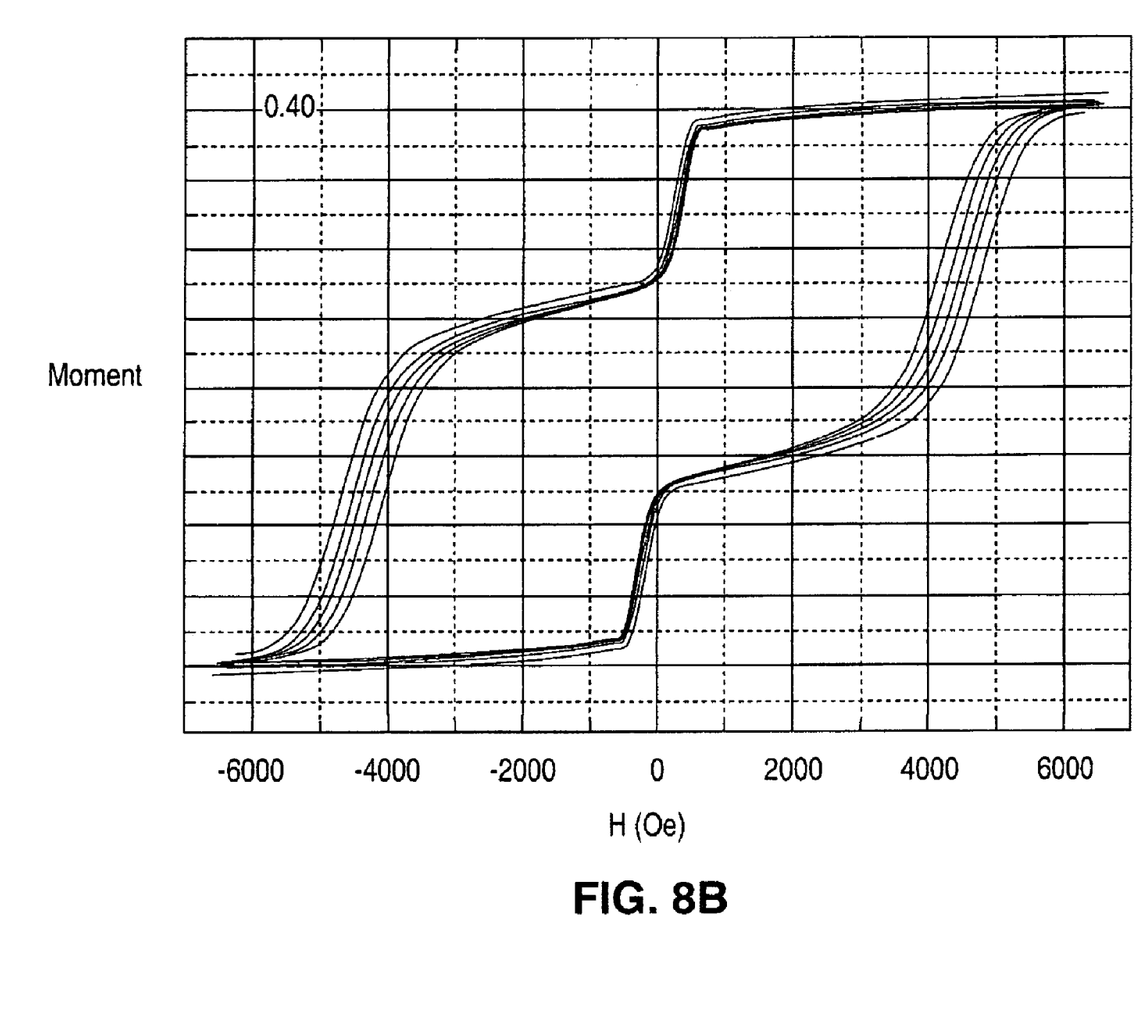

FIGS. 8A and 8B illustrate the effect of H-Field Sweep-Rate on MrT for magnetic recording media with lower and higher Ms, respectively. In particular, the H$_{app}$-field sweep rate for FIGS. 8A and 8B varied between 0.1 seconds to several seconds. The magnetic disk of FIG. 8B had a lower magnetic layer exhibiting an Ms of about 550/cm$^3$. Because of this, antiferromagnetic coupling between the upper and lower magnetic layers was relatively high, and the lower magnetic layer generally switched magnetization directions before the applied field H$_{app}$ reached 0 Oe. In other words, Mr was generally independent of the sweep rate.

In contrast, the lower magnetic layer of FIG. 8A had a lower Ms (300 emu/cm$^3$) and thus exhibited less antiferromagnetic coupling. Therefore, in the context of the magnetic medium of FIG. 8A (with a lower level Hc close to the exchange field strength), Mr was more dependent on sweep rate—an undesirable characteristic because it does not allow the lower layer to switch quickly to the desired state.

Figure 9A:
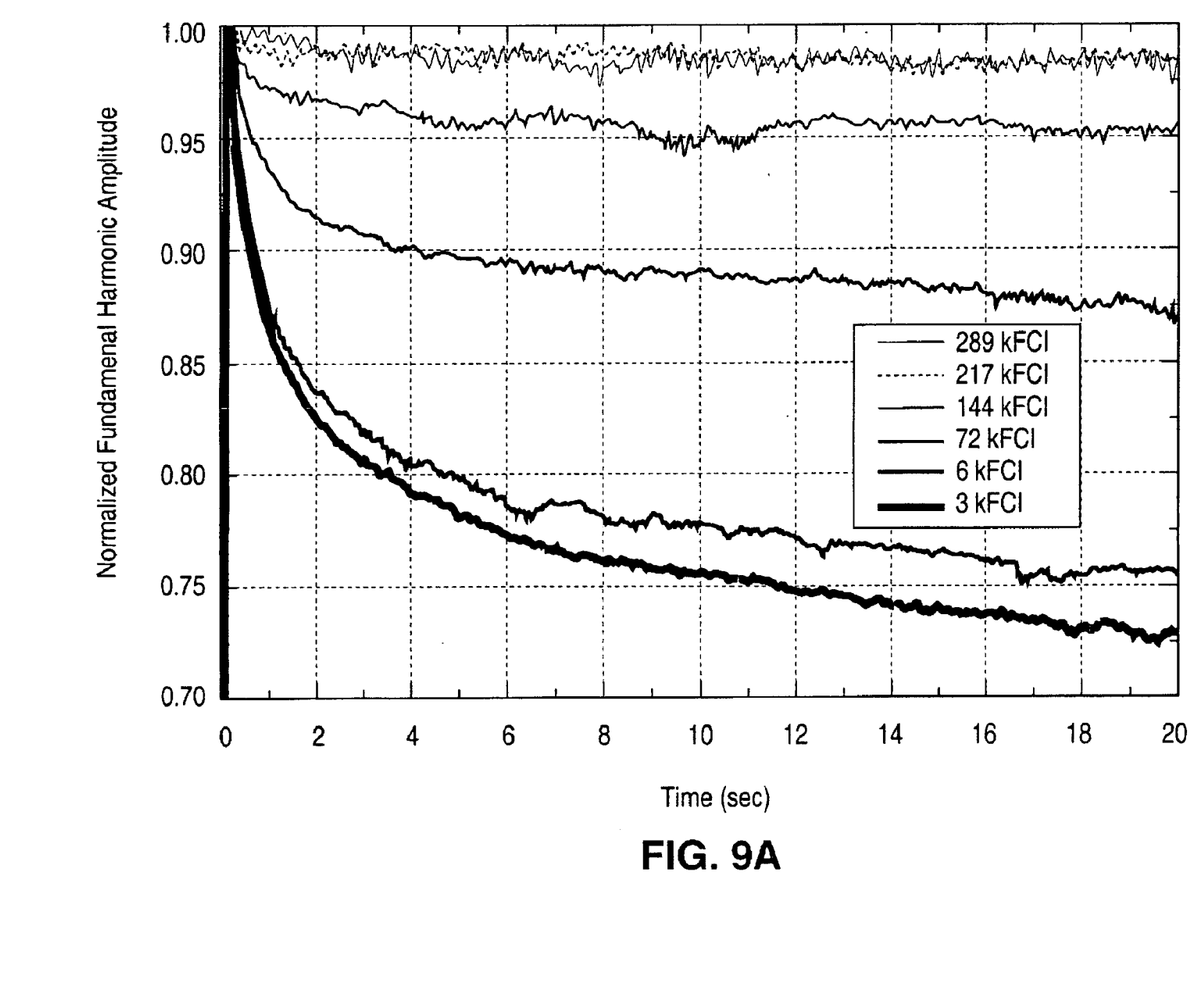
FIG. 9A illustrates the fundamental harmonic amplitude decay for a magnetic recording medium in which the exchange field is about 300 Oe.
Figure 9B:
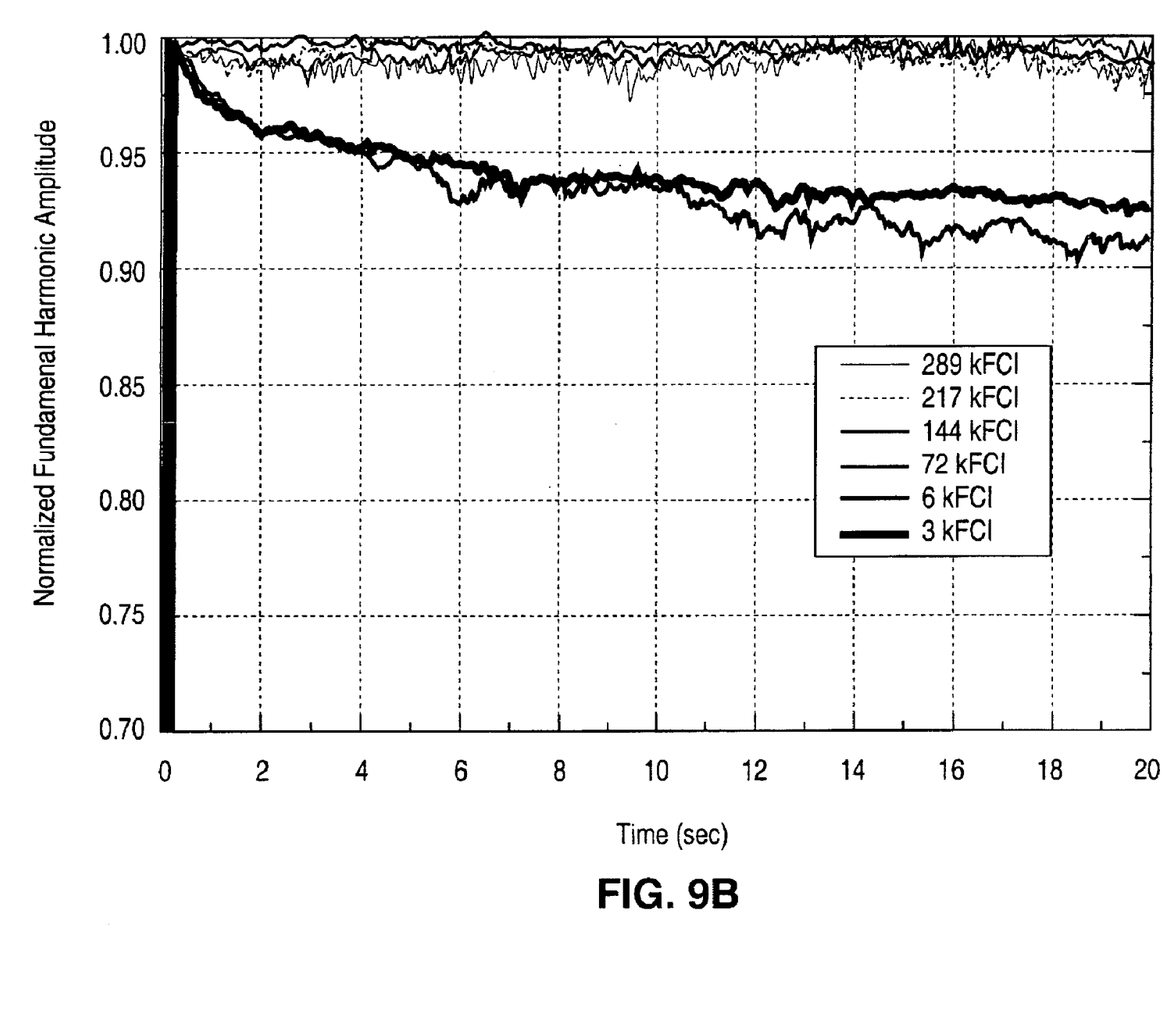
FIG. 9B illustrates the fundamental harmonic amplitude decay for a magnetic recording medium in which the exchange field is about 2500 Oe.

FIGS. 9A and 9B illustrate the fundamental harmonic amplitude decay for magnetic recording media with an exchange coupling field Hex of 300 Oe and 2500 Oe, respectively. The Y axis of FIGS. 9A and 9B represents the normalized fundamental harmonic amplitude. In other words, after data is recorded in the magnetic recording medium, the amplitude of the recorded signal is repeatedly read back. The Y axis represents subsequent read-back values divided by the initial read-back value. Data in FIG. 9A was generated for different data recording densities. As can be seen, the extent to which amplitude dropped over time was highly dependent on recording density. For example, for a density of 3 kFCI (3000 flux changes per inch), over a 20 second time period, the normalized fundamental harmonic amplitude dropped to approximately 0.73, whereas for a density of 289 kFCI, the normalized fundamental harmonic amplitude only dropped to a value of about 0.98 after 20 seconds. The reason for this difference is that the demagnetizing field increases as recording density increases (i.e. as the size of a magnetized region decreases). This demagnetizing field helps to switch the magnetization direction in lower magnetic layer 106. If the demagnetizing field is small (as in the case of a low recording density), it provides less assistance in switching the magnetization direction of magnetic layer 106, and therefore it takes magnetic layer 106 more time to settle into a final magnetization state (i.e. magnetized in direction D4).

As mentioned above, the data of FIG. 9A was generated for a disk exhibiting relatively low antiferromagnetic coupling between the upper and lower magnetic layers, e.g. for an exchange field of about 300 Oe. In FIG. 9B, the disk exhibited relatively high antiferromagnetic coupling between the upper and lower magnetic layers, i.e. about 2500 Oe. This relatively high coupling promotes switching of the magnetization direction of the lower magnetic layer 106. Therefore, even for fairly low recording densities (e.g. 3 kFCI), the normalized fundamental harmonic amplitude after 20 seconds is about 0.91, compared to 0.73 for FIG. 9A. A significant change in normalized fundamental harmonic amplitude is undesirable because it means that medium 100 may exhibit inadequate switching and signal stability.

Figure 7:
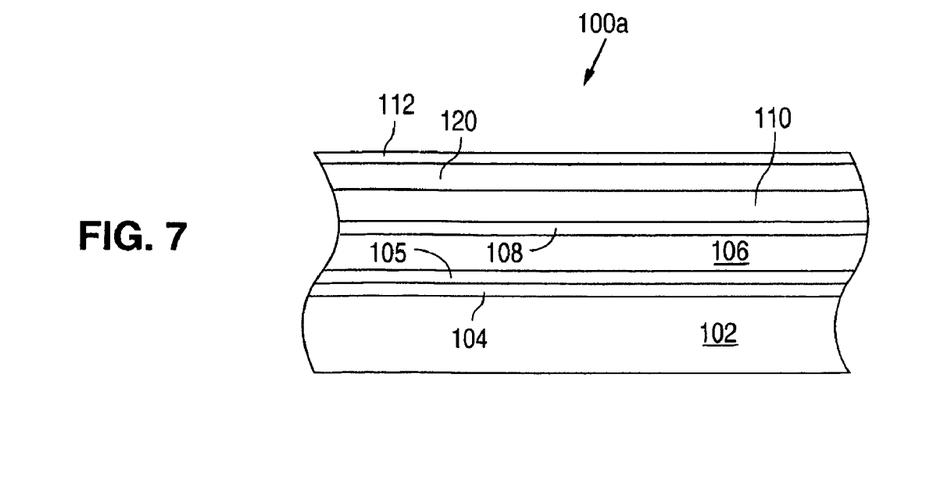
FIG. 7 illustrates in cross section a magnetic recording medium in accordance with a second embodiment of the invention.

FIG. 7 illustrates a magnetic recording medium 100a constructed in accordance with another embodiment of the invention. Medium 100a is similar to medium 100 of FIG. 6, but includes an optional seed layer 105 formed between underlayer 104 and lower magnetic layer 106. Seed layer 105 can be as discussed in U.S. Pat. No. 6,150,015, issued to Bertero et al. on Nov. 21, 2000, incorporated herein by reference.

Also shown in FIG. 7 is a magnetic layer 120 formed on magnetic layer 110. Magnetic layer 120 enables one to tailor medium 100a with enhanced flexibility so that it exhibits desired Hc, MrT, noise or PW50. In the embodiment of FIG. 7, layer 120 can be 10 nm thick, and can comprise $CoCr_{24}Pt_{12}B_8$, while layer 110 can be 6 nm thick and comprise $CoCr_{15}Pt_{11}B_{12}$. Alternatively, magnetic layer 120 could comprise another alloy such as CoCrPtTaB, other Co alloys, a Ni alloy or a Fe alloy.

Figure 10:
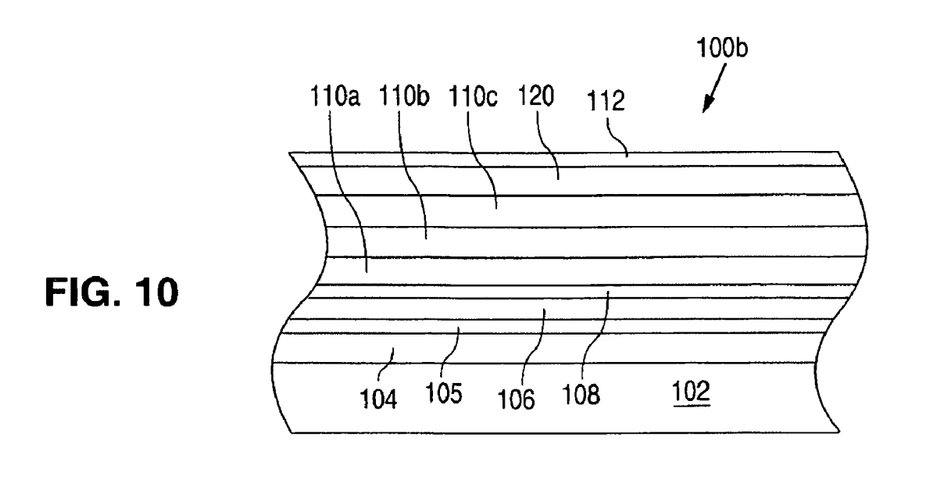
FIG. 10 illustrates a magnetic recording medium constructed in accordance with third embodiment of the invention.

FIG. 10 illustrates a magnetic recording medium in accordance with another embodiment of the invention. In FIG. 10, a medium 100b comprises substrate 102, a 8 nm thick Cr—$Mo_{20}$ underlayer 104, a 2 nm thick $CoCr_{25}Ta_2$ seed layer 105, a 4 nm thick $CoCr_{16}Ta_4$ magnetic layer 106, a 0.8 nm thick Ru intermediate layer 108, magnetic sublayers 110a, 110b and 110c and a protective overcoat 112. Merely by way of example, sublayers 110a, 110b and 110c can be 2 nm thick $CoCr_{16}Ta_4$, 6 nm thick $CoCr_{23}Pt_{11}B_5Ta_1$ and 6 nm thick $CoCr_{15}Pt_{10}B_{12}$. In this embodiment, sublayers 110a, 110b, and 110c (which make up upper magnetic layer 110) are magnetized in a first direction, while lower magnetic layer 106 is magnetized in a second direction opposite the first direction by virtue of antiferromagnetic coupling resulting from intermediate layer 108. Thus, it is seen that the upper magnetic layers can comprise a plurality of sublayers. In an alternative embodiment, lower layer 106 can also comprise a plurality of sublayers.

In this patent, the term "layer structure" will refer to a structure comprising one layer or a plurality of layers that are ferromagnetically coupled to one another. Thus, as used herein, lower layer 106 is a layer structure, and layers 110a, 110b and 110c collectively are a layer structure.

Figure 11:
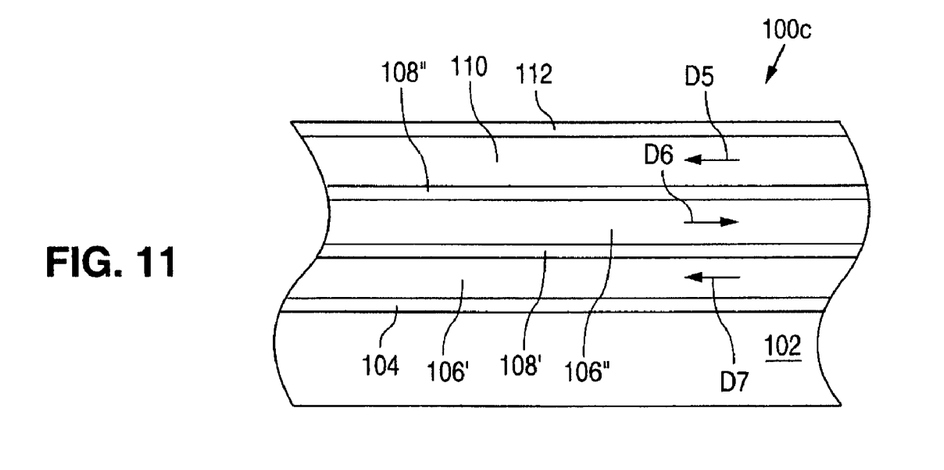
FIG. 11 illustrates a magnetic recording medium constructed in accordance with a fourth embodiment of the invention.

FIG. 11 illustrates a medium 100c comprises a lowermost magnetic layer 106', a lower Ru layer 108', a magnetic layer 106", a Ru layer 108" an uppermost magnetic layer 110 and a protective overcoat 112. For the embodiment of FIG. 11, the magnetic characteristics of layer 110 are as described above for the embodiments of 6, 7 and 10. Ku layers 108' and 108" are typically between 0.3 and 1.0 nm thick, and facilitate the above-described antiferromagnetic coupling phenomenon. Layers 106' and 106" have the same magnetic characteristics as those described above for layer 106 in the embodiments of FIGS. 6, 7 and 10. If one writes data in layer 10 such that the magnetization direction is D5 and then removes the applied write magnetic field $H_{app}$, the magnetization direction in layer 106" will be direction D6, which is in the opposite direction of D5. The magnetization direction in layer 106' will be direction D7, which is the opposite of direction D6.

While FIG. 11 shows two Ru layers 108', 108" sandwiched between magnetic layers, in other embodiments, three or more Ru layers can be provided, each sandwiched between magnetic layers. The benefit of this embodiment is to create greater thermal stability in medium 100c.

In the embodiments of FIGS. 6, 7, 10 and 11, the magnetization direction in layer 106 (or layers 106' and 106" for the case of FIG. 11) is controlled by the magnetization direction in layer 110. In particular, layer 110 is antiferromagnetically coupled to layer 106 (or to layer 106" for the case of FIG. 11) and the magnetization in layer 110 forces layer 106 (106") to assume a magnetization direction that is opposite to the direction of layer 110. Similarly, the antiferromagnetic coupling between layers 106' and 106" cause layer 106' to have a magnetization direction that is opposite to the magnetization direction of layer 106". In effect, the magnetization directions for layers 106, 106' and 106" are determined by the magnetization direction of layer 110. Thus, it can be said that layers 106, 106' and 106" are "slave layers", i.e. layers whose steady state magnetization direction (after the write field has been removed) is determined either directly or indirectly by a "master layer", e.g. layer 110.

Magnetic recording media in accordance with the invention are typically manufactured using a vacuum deposition technique such as sputtering. For example, one or more substrates can be placed in a substrate carrier that carries the substrates past a set of sputtering targets to deposit the various layers of the magnetic disk. The targets have compositions that are substantially the same as the composition of the layers that they are used to produce. Sputtering is typically accomplished in an atmosphere comprising an inert gas such as argon. (Other gases may be present in the sputtering chamber as well.)

Figure 12:
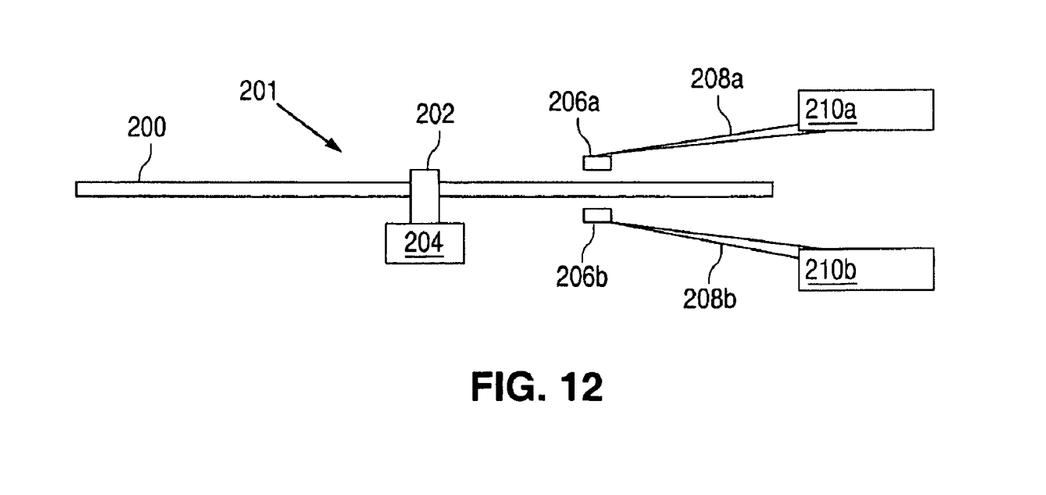
FIG. 12 illustrates a magnetic disk in accordance with the present invention incorporated into a disk drive.

A magnetic medium in accordance with the invention (e.g. medium 100, 100a, 100b or 100c) is typically in the form of a disk incorporated within a disk drive, e.g. disk 200 drive 201 (FIG. 11). Disk drive 201 comprises magnetic disk 200 mounted on a spindle 202 which is coupled to a motor 204 for rotating disk 200. A pair of read-write heads 206a, 206b are positioned proximate to disk 200 for reading data from and writing data to magnetic layers on each side of disk 200. Heads 206a, 206b are mounted on suspensions 208a, 208b, which in turn are mounted on actuators (e.g. rotary or linear actuators 210a, 210b) for moving heads 206a, 206b over desired data recording tracks of disk 200. Although only one disk 200 is shown in drive 201, drive 201 can contain multiple disks.

While the invention has been described with respect to specific embodiments, those skilled in the art will recognize that changes can be made in form and detail without departing from the spirit and scope of the invention. For example, the disk substrate can be textured, e.g. using mechanical, chemical, and/or laser texturing techniques. Different types of protective overcoats (e.g. carbon, hydrogenated or nitrogenated carbon, or zirconia) can be applied to upper magnetic layer 110. A lubricant can be applied to the top surface of the disk (e.g. a perfluoropolyether lubricant). The various layers of the magnetic disk can be formed by any of a number of deposition techniques, e.g. a vacuum deposition technique such as sputtering. Different segregants can be added to one or more of the magnetic layers to break exchange coupling between the grains, e.g. boron, silica, alumina, zirconia, or other oxides such as tantalum oxide, cobalt oxide, etc. Different magnetic layer thicknesses can be employed. Different aspects or features of the invention can be practiced independently of one another. Accordingly, all such changes come within the invention.

We claim:

1. A magnetic disk drive comprising:
    a magnetic disk containing recorded dare;
    a read-write head; and
    a motor coupled to rotate said magnetic disk at a rotational velocity during ordinary operation of said disk drive;
    said magnetic disk comprising:
    a substrate;
    a lower magnetic layer structure formed over the substrate;
    an intermediate layer comprising Ru; and
    an upper magnetic layer structure formed over the intermediate layer, said upper magnetic layer structure being antiferromagnetically coupled to the lower magnetic layer structure, wherein the relationship between the dynamic coercivity of the lower magnetic layer structure and the exchange field is such that after termination of application of a write magnetic field to the usable locations on the disk the portion of the lower magnetic layer structure at said locations achieve substantially their steady magnetization state within the time required for one revolution of said disk when said disk is being rotated at said rotational velocity.

2. Magnetic disk drive or claim 1 further comprising an underlayer formed between the substrate and the lower magnetic layer structure, and wherein at least one of said upper and lower magnetic layer structures comprises a plurality of layers.

3. A magnetic disk drive comprising:
    a magnetic disk containing recorded data;
    a read-write head; and
    a motor coupled to rotate said magnetic disk at a rotational velocity during ordinary operation of said disk drive;
    said magnetic disk comprising:
    a substrate;
    a lower magnetic layer structure formed over the substrate;
    an intermediate layer comprising Ru; and
    an upper magnetic layer structure formed over the intermediate layer, said upper magnetic layer structure being antiferromagnetically coupled to the lower magnetic layer structure, wherein the relationship between the dynamic coercivity of the lower magnetic layer structure and the exchange field is such that after termination of application of a write magnetic field to the usable locations on the disk the portion of the lower magnetic layer structure at said locations achieve more than 90% of their steady magnetization state within the time required for one revolution of said disk when said disk is being rotated at said rotational velocity.

4. Magnetic disk drive of claim 3 further comprising an underlayer formed between the substrate and the lower magnetic layer structure, and wherein at least one of said upper and lower magnetic layer structures comprise a plurality of layers.

5. Magnetic disk drive of claim 3 wherein the relationship between the dynamic coercivity of the lower magnetic layer structure and the exchange field is such that after termination of application of a write magnetic field to the usable locations on the disk the portion of the lower magnetic layer structure at said locations achieves more than 95% of their steady magnetization state within the time required for one revolution of said disk when said disk is being rotated at said rotational velocity.

6. Method for using a magnetic disk drive, said magnetic disk drive comprising a magnetic disk containing recorded data, a read-write head, and a motor coupled to rotate said magnetic disk at a rotational velocity during ordinary operation of said disk drive, said magnetic disk comprising a substrate, a lower magnetic layer structure formed over the substrate, an intermediate layer comprising Ru, and an upper magnetic layer structure formed over the intermediate layer, said upper magnetic layer structure being antiferromagnetically coupled to the lower magnetic layer structure, said method comprising:
    rotating said magnetic disk;
    recording data in said magnetic disk by applying a write magnetic field to locations on said magnetic disk; and
    terminating application of said write magnetic field to said locations on said magnetic disk, wherein the relationship between the dynamic coercivity of the lower magnetic layer structure and the exchange field is such that after said termination the portion of the lower magnetic layer structure at said locations achieve substantially their steady magnetization state within the time required for one revolution of said disk when said disk is being rotated at said rotational velocity.

7. Method of claim 6 wherein said magnetic disk further comprises an underlayer formed between the substrate and the lower magnetic layer structure, and wherein at least one of said upper and lower magnetic layer structures comprises a plurality of layers.

8. Method for using a magnetic disk drive, said magnetic disk drive comprising a magnetic disk containing recorded data, a read-write head, and a motor coupled to rotate said magnetic disk at rotational velocity during ordinary operation of said disk drive, said magnetic disk comprising a substrate, a lower magnetic layer structure formed over the substrate, an intermediate layer comprising Ru, and an upper magnetic layer structure formed over the intermediate layer said upper magnetic layer structure being antiferromagnetically coupled to the lower magnetic layer structure, said method comprising:
    rotating said magnetic disk;
    recording data in said magnetic disk by applying a write magnetic field to locations on said magnetic disk; and
    terminating application of said write magnetic field to said locations on said magnetic disk, wherein the relationship between the dynamic coercivity of the lower magnetic layer structure and the exchange field is such that after said termination the portion of the lower magnetic layer structure at said locations achieve more than 90% of their steady magnetization state within the time required for one revolution of said disk when said disk is being rotated at said rotational velocity.

9. Method of claim 8 wherein the relationship between the dynamic coercivity of the lower magnetic layer structure and the exchange field is such that after termination of application of a write magnetic field to the usable locations on the disk the portion of the lower magnetic layer structure at said locations achieves more than 95% of their steady magnetization state within the time required for one revolution of said disk when said disk is being rotated at said rotational velocity.

10. Method of claim 8 wherein said magnetic disk further comprises an underlayer formed between the substrate and the lower magnetic layer structure, and wherein at least one of said upper and lower magnetic layer structures comprises a plurality of layers.

* * * * *

UNITED STATES PATENT AND TRADEMARK OFFICE
CERTIFICATE OF CORRECTION

PATENT NO.       : 7,070,870 B2
APPLICATION NO.  : 11/048153
DATED            : July 4, 2006
INVENTOR(S)      : Bertero et al.

It is certified that error appears in the above-identified patent and that said Letters Patent is hereby corrected as shown below:

Column 9, line 3, "dare" should read --data--.

Column 9, line 24, "Magnetic disk drive or claim 1" should read --Magnetic disk drive of claim 1--.

Signed and Sealed this

Twenty-seventh Day of February, 2007

JON W. DUDAS
*Director of the United States Patent and Trademark Office*